United States Patent
Kamei et al.

(10) Patent No.: US 9,829,726 B2
(45) Date of Patent: Nov. 28, 2017

(54) ELECTRO-OPTICAL MODULATOR

(71) Applicants: NATIONAL INSTITUTE OF ADVANCED INDUSTRIAL SCIENCE AND TECHNOLOGY, Tokyo (JP); PHOTONICS ELECTRONICS TECHNOLOGY RESEARCH ASSOCIATION, Tokyo (JP)

(72) Inventors: Toshihiro Kamei, Ibaraki (JP); Ryohei Takei, Ibaraki (JP); Masahiko Mori, Ibaraki (JP); Youichi Sakakibara, Ibaraki (JP); Junichi Fujikata, Tokyo (JP)

(73) Assignees: NATIONAL INSTITUTE OF ADVANCED INDUSTRIAL SCIENCE AND TECHNOLOGY (JP); PHOTONICS ELECTRONICS TECHNOLOGY RESEARCH ASSOCIATION (JP)

(*) Notice: Subject to any disclaimer, the term of this patent is extended or adjusted under 35 U.S.C. 154(b) by 0 days.

(21) Appl. No.: 14/345,316

(22) PCT Filed: Feb. 20, 2014

(86) PCT No.: PCT/JP2014/054006
§ 371 (c)(1),
(2) Date: Mar. 17, 2014

(87) PCT Pub. No.: WO2015/122022
PCT Pub. Date: Aug. 20, 2015

(65) Prior Publication Data
US 2016/0349545 A1    Dec. 1, 2016

(30) Foreign Application Priority Data
Feb. 17, 2014  (JP) ................ 2014-027772

(51) Int. Cl.
G02F 1/035    (2006.01)
G02F 1/025    (2006.01)
G02F 1/015    (2006.01)

(52) U.S. Cl.
CPC ...... G02F 1/025 (2013.01); *G02F 2001/0151* (2013.01); *G02F 2202/103* (2013.01); *G02F 2202/105* (2013.01)

(58) Field of Classification Search
CPC ........ G02F 1/225; G02F 1/2255; G02F 1/035; G02F 1/0356; G02F 1/025; G02F 1/2257
See application file for complete search history.

(56) References Cited

U.S. PATENT DOCUMENTS

| 5,730,808 A | 3/1998 | Yang et al. ............ 136/249 |
| 6,522,799 B1 | 2/2003 | Bazylenko et al. ...... 385/14 |

(Continued)

FOREIGN PATENT DOCUMENTS

| JP | H08316485 | 11/1996 | ........ H01L 21/20 |
| JP | H1074969 | 3/1998 | ........ C23C 16/40 |

(Continued)

OTHER PUBLICATIONS

European Search Report issued in application No. 14160548.5, dated Jul. 30, 2014 (8 pgs).

(Continued)

*Primary Examiner* — Jennifer Doan
(74) *Attorney, Agent, or Firm* — Hayes Soloway P.C.

(57) ABSTRACT

An electro-optical modulator includes a substrate 201; an optical waveguide formed of a silicon-containing i-type amorphous semiconductor 204 on the substrate; and a silicon-containing p-type semiconductor layer 203 and a silicon-containing n-type semiconductor layer 205 arranged apart from each other with the silicon-containing optical waveguide formed of an i-type amorphous semiconductor (Continued)

204 interposed therebetween and constituting optical waveguides together with the silicon-containing optical waveguide formed of an i-type amorphous semiconductor. The silicon-containing p-type semiconductor layer 203 and/or silicon-containing n-type semiconductor layer 205 area crystalline semiconductor layer.

30 Claims, 11 Drawing Sheets

(56) References Cited

U.S. PATENT DOCUMENTS

| | | | |
|---|---|---|---|
| 6,845,198 B2 | 1/2005 | Montgomery et al. | 385/50 |
| 7,257,283 B1 | 8/2007 | Liu | 385/14 |
| 2004/0235267 A1* | 11/2004 | Sheats | H01L 21/67092 |
| | | | 438/455 |
| 2006/0246269 A1* | 11/2006 | Yukawa | B82Y 10/00 |
| | | | 428/209 |
| 2011/0243492 A1 | 10/2011 | Na et al. | 385/3 |
| 2012/0057815 A1 | 3/2012 | Ezaki et al. | 385/3 |
| 2012/0243828 A1 | 9/2012 | Suzuki | 385/32 |

FOREIGN PATENT DOCUMENTS

| | | | |
|---|---|---|---|
| JP | H11283922 | 10/1999 | H01L 21/20 |
| JP | 2002540452 | 11/2002 | G02B 6/12 |
| JP | 2004031518 | 1/2004 | H01L 31/04 |
| JP | 2006515082 | 5/2006 | G01B 9/02 |
| JP | 2009-537871 | 10/2009 | G02B 6/122 |
| JP | 2012053399 | 3/2012 | G02F 1/025 |

OTHER PUBLICATIONS

International Search Report issued in application No. PCT/JP2014/054006, dated Apr. 10, 2014 (2 pgs).

Barrios et al., "Electrooptic Modulation of Silicon-on-Insulator Submicrometer-Size Waveguide Devices," Journal of Lighwave Technology, vol. 21, No. 10, Oct. 2003 (10 pgs).

Fujikata et al., "High Speed and Highly Efficient Si Optical Modulator with MOS Junction for 1.55 μm and 1.3 μm Wavelengths," 2013 IEEE 10$^{th}$ International Conference on Group IV Photonics (GFP), Aug. 28, 2013, ThA4 (Contributed) (3 pgs).

Della Corte et al., "Use of Amorphous Silicon for Active Photonic Devices," IEEE Transactions on Electron Devices,vol. 60, No. 5, May 2013, (11 pg).

International Preliminary Report on Patentability issued in application No. PCT/JP2014/054006, dated Sep. 1, 2016 (9 pgs).

Shoji, Yuya, et al. "Ultrafast nonlinear effects in hydrogenated amorphous silicon wire waveguide" Optics Express, vol. 18 No. 6, Mar. 15, 2010, 5668-5673 (6 pgs).

Corte, et al. "Electro-optical modulation at 1550 nm in an as-deposited hydrogenated amorphous silicon p-i-n waveguiding device" Optical Express, vol. 19, No. 4, Feb. 14, 2011, 2941-2951 (11pgs).

\* cited by examiner

ELECTRO-OPTICAL MODULATOR

TECHNICAL FIELD

The present invention relates to a waveguide-type electro-optical modulator in which silicon is used.

BACKGROUND ART

Much attention is being given to silicon photonics technology that integrates optical devices and electronic devices at high density in a unified manner on the same silicon substrate. There are great expectations for this technology in applications not only in the field of optical communications, but in optically interconnect of integrated circuits, and R&D is progressing vigorously at present.

In silicon photonics technology, it is common to use a silicon on insulator (SOI) substrate, in which single crystalline silicon (c-Si) is formed on top of a buried oxide (BOX) film, but there is a problem that an extremely high temperature process of 1100° C. or higher is required to form the c-Si, and the SOI substrate is expensive.

Also proposed is a silicon photonics technique that uses hydrogenated amorphous silicon (a-Si:H) films, which can deposited at low temperatures; i.e., 400° C. or lower, while exhibiting performance of a nature that rivals c-Si or surpasses the same in some characteristics including nonlinear optical characteristics, and R&D of a diverse range of passive devices has been conducted to date.

In fact, while it goes without saying that active devices including high-speed electro-optical conversion devices or optical switching devices of a nature that switch optical paths by electrical signals are required to perform communications of electrical signals with light waves as carrier waves, there are not many reports related to these. One reason is that a-Si:H has low electrical characteristics of mobility, conductivity, or the like because of its non-crystalline material.

Meanwhile, as is disclosed in non-patent document 1, it is known that with carriers in a-Si:H internally injected or excited with some kind of process relaxes in a very short time, typically in sub-picoseconds, and this is due to the fact that relaxation of wave function of the carriers from an extended state to a localized state, specifically a tail state, is extremely fast. Since the tail state stem from variation of Si bond lengths or bond angles the high-speed carrier relaxation is unique phenomenon due to a random structure.

Many electro-optical modulators based on c-Si have been reported on (for example, patent document 1), but in the case of c-Si, one of major factors is that the carrier relaxation time is comparatively slow and the modulation speed is limited. In short, it can be said that in terms of carrier relaxation time, a-Si:H has more advantageous characteristics as a high-speed modulator compared with c-Si.

FIG. 11 illustrates one example of an a-Si:H based electro-optical modulator fabricated with a low-temperature process using a-Si:H described in non-patent document 2.

This electro-optical modulator comprises: an i-type a-Si:H layer 103 not doped with impurities as a waveguide core on a silicon substrate 101; a p-type a-SiC:H layer 102 as a lower cladding, doped with impurities as a p-type semiconductor in hydrogenated amorphous silicon carbide (a-SiC:H), which has a somewhat lower refractive index than i-type a-Si:H while likewise being capable of low-temperature growth in the same manner as i-Si:H; an n-type a-SiC:H layer 104 doped with impurities as an upper cladding layer on the i-type a-Si:H layer 103; and a zinc oxide/aluminum electrode 105 on the top.

The structure illustrated in FIG. 11 constitutes an optical waveguide structure having the i-type a-Si:H layer 103 with the highest refractive index as the waveguide core, and at the same time the p-type layer (102), i-type layer (103), and n-type layer (104) constitutes a pin structure.

In this electro-optical modulator, the conductivities of the a-SiC:H of the n-type layer (104) and the p-type layer (102) are $2.3 \times 10^{-6}$ S/cm and $1.9 \times 10^{-8}$ S/cm, respectively.

The abovementioned electro-optical modulator is connected to an external power source so that voltage is applied to the i-type a-Si:H layer 103 through the silicon substrate 101 and the zinc oxide/aluminum layer 105 on top of the waveguide. When reverse bias is applied to the i-type layer (103), depletion layers spread to sides of each of the p-type layer (102) and the n-type layer (104), the carrier density of the i-type layer (103) decreases, and the refractive index of the i-type a-Si:H layer 103 increases.

The phases of the light waves propagating inside the waveguide with the i-type a-Si:H layer 103 as the waveguide core can be modulated thereby, and in this case the operating speed of the abovementioned electro-optical modulator is limited mainly in accordance with the mobilities and conductivities of the p-type layer (102) and the n-type layer (104). However, in the case of the electro-optical modulator described in non-patent document 2, it is extremely difficult to obtain a high-speed modulation operation of a nature that exceeds 1 Gbps, because a-SiC:H, which has extremely low mobility and conductivity, is used in the p-type layer (102) and the n-type layer (104). Specifically, it cannot be said that the high-speed carrier relaxation characteristics of a-Si:H are exploited in this electro-optical modulator.

PRIOR ART DOCUMENTS

Patent Documents

Patent document 1: Japanese Laid-open Patent Publication No. 2009-537871

Non-Patent Documents

Non-patent document 1: Y. Shoji, T. Ogasawara, T. Kamei, Y. Sakakibara, S. Suda, K. Kintaka, H. Kawashima, W. Okano, T. Hasama, H. Ishikawa, and M. Mori, "Ultrafast nonlinear effects in hydrogenated amorphous silicon wire waveguide," Opt. Express, 18, 5669-5673 (2010).

Non-patent document 2: F. G. Della Corte, S. Rao, G. Coppola, and C. Summonte, "Electro-optical modulation at 1550 nm in an as-deposited hydrogenated amorphous silicon p-i-n waveguiding device," Opt. Express, 19, 2941-2951 (2011).

DISCLOSURE OF THE INVENTION

Problems to be Solved by the Invention

As for the conventional electro-optical modulator, high speed carrier injection into the a-Si:H layer cannot be realized because the conductivities and mobilities of the p-type layer and the n-type layer are low. Therefore a high-speed electro-optical modulator could not be produced despite the fact that a-Si:H has very high-speed carrier relaxation characteristics.

Accordingly, an object of the present invention is to provide an electro-optical modulator that allows high-speed carrier injection to a silicon-containing i-type amorphous semiconductor, particularly a-Si:H, and has little optical loss. An additional object is to provide an high speed electro-optical modulator that can be fabricated with low-temperature processes.

Means for Solving the Problems

The means for solving the abovementioned problems are as follows:

(1) An electro-optical modulator, comprising: an optical waveguide comprising a silicon-containing i-type amorphous semiconductor; and a silicon-containing p-type semiconductor layer and a silicon-containing n-type semiconductor layer arranged apart from each other with the optical waveguide comprising an i-type amorphous semiconductor interposed therebetween and constituting optical waveguides together with the optical waveguide comprising an i-type amorphous semiconductor; the electro-optical modulator being characterized in that the p-type semiconductor layer and/or n-type semiconductor layer are a crystalline semiconductor layer.

(2) An electro-optical modulator, comprising: a substrate; an optical waveguide comprising a silicon-containing i-type amorphous semiconductor formed on the substrate; and a silicon-containing p-type semiconductor layer and a silicon-containing n-type semiconductor layer arranged apart from each other with the optical waveguide comprising an i-type amorphous semiconductor interposed therebetween and constituting optical waveguides together with the optical waveguide comprising an i-type amorphous semiconductor; the electro-optical modulator being characterized in that the p-type semiconductor layer and/or n-type semiconductor layer are a crystalline semiconductor layer.

(3) The electro-optical modulator according to (1) or (2), characterized in that the silicon-containing i-type amorphous semiconductor is hydrogenated amorphous silicon.

(4) The electro-optical modulator according to (1) or (2), characterized in that the silicon-containing i-type amorphous semiconductor is hydrogenated amorphous Si—Ge.

(5) The electro-optical modulator according to any of (1) to (4), characterized in that the crystalline semiconductor layer is a semiconductor layer comprising hydrogenated microcrystalline silicon.

(6) The electro-optical modulator according to any of (1) to (4), characterized in that the crystalline semiconductor layer is a semiconductor layer comprising laser-crystallized silicon.

(7) The electro-optical modulator according to any of (1) to (4), characterized in that the crystalline semiconductor layer is a semiconductor layer comprising metal induced solid phase crystallized silicon.

(8) The electro-optical modulator according to any of (1) to (4), characterized in that the crystalline semiconductor layer comprises single crystalline silicon.

(9) The electro-optical modulator according to any of (1) to (4), characterized in that the crystalline semiconductor layer is microcrystalline SiC.

(10) The electro-optical modulator according to any of (1) to (4), characterized in that the crystalline semiconductor layer is microcrystalline SiO.

(11) The electro-optical modulator according to any of (1) to (10), characterized in that the p-type semiconductor layer and n-type semiconductor layer are in a vertically stacked arrangement with the optical waveguide comprising an i-type amorphous semiconductor interposed therebetween.

(12) The electro-optical modulator according to any of (1) to (10), characterized in that the p-type semiconductor layer and n-type semiconductor layer are in a laterally adjacent arrangement with the optical waveguide comprising an i-type amorphous semiconductor interposed therebetween.

(13) The electro-optical modulator according to any of (1) to (10), characterized in that the p-type semiconductor layer and n-type semiconductor layer are in a laterally opposing arrangement with the optical waveguide comprising an i-type amorphous semiconductor interposed therebetween.

(14) The electro-optical modulator according to any of (1) to (13), characterized in that the refractive index of the optical waveguide comprises an i-type amorphous semiconductor being made variable by applying voltage or flowing current between the p-type semiconductor layer and n-type semiconductor layer.

(15) The electro-optical modulator according to any of (2) to (14), characterized in that the substrate is an SOI substrate.

(16) The electro-optical modulator according to any of (2) to (14), characterized in that the substrate is an optical integrated circuit substrate.

Effect of the Invention

According to the present invention, an electro-optical modulator comprises an optical waveguide comprising a silicon-containing i-type amorphous semiconductor, and a silicon-containing p-type semiconductor layer and a silicon-containing n-type semiconductor layer arranged apart from each other with the optical waveguide comprising the i-type amorphous semiconductor interposed therebetween to constitute optical waveguides together with the optical waveguide comprising the i-type amorphous semiconductor. Since in the electro-optical modulator, at least one of the p-type semiconductor layer and n-type semiconductor layer is formed as a crystalline semiconductor layer such as hydrogenated microcrystalline silicon (µc-Si:H), laser-crystallized silicon, or metal induced solid phase crystallized silicon, carriers can be injected at high speed into the i-type amorphous semiconductor layer and the high-speed carrier relaxation phenomenon of i-type amorphous semiconductors such as a-Si:H can be utilized. This allows an electro-optical modulator to operate at high-speed and have little optical loss.

Also according to the present invention, a high-speed optical modulator having an optical waveguide comprising an i-type amorphous semiconductor such as a-Si:H can be realized using a fabrication process at a temperature of 400° C. or lower.

MODE FOR CARRYING OUT THE INVENTION (Electro-Optical Modulator According to the Present Invention)

The electro-optical modulator according to the present invention comprises a silicon-containing i-type amorphous semiconductor optical waveguide, and a silicon-containing p-type semiconductor layer and a silicon-containing n-type semiconductor layer arranged apart from each other interposed by the i-type amorphous semiconductor optical waveguide to constitute optical waveguides together with the amorphous semiconductor optical waveguide. When at least one of the above semiconductor layers is formed as a crystalline semiconductor layer such as of hydrogenated microcrystalline silicon (μc-Si:H), laser-crystallized silicon, or metal induced solid phase crystallized silicon, the structure of the electro-optical modulator allows high-speed injection of carriers into the i-type amorphous semiconductor optical waveguide.

Embodiments and modified examples of the electro-optical modulator according to the present invention are described below with reference to FIGS. 1 to 10.

The embodiments and modified examples illustrated below are merely for the purpose of facilitating understanding of the electro-optical modulator according to the present invention, and modifications, other embodiments, and the like, based on the technical concepts of the present invention set forth in the claims are included in the electro-optical modulator of the present invention, as shall be apparent.

First Embodiment

Figure 1:
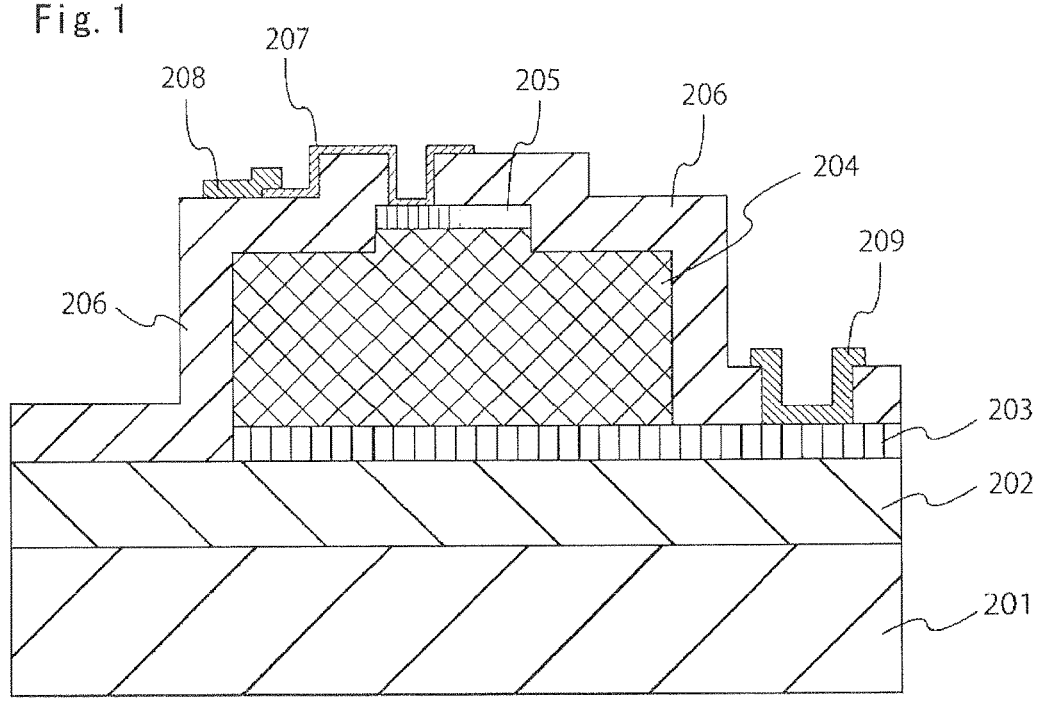
FIG. 1 is a cross-sectional schematic diagram of the electro-optical modulator according to a first embodiment.

FIG. 1 is a cross-sectional schematic diagram of a first embodiment of the present invention.

This electro-optical modulator is provided with a silicon thermal oxide film 202 obtained on a silicon substrate 201 by thermally oxidizing the silicon substrate, and an approximately 0.1 μm-thick B (boron)-doped p-type μc-Si:H layer 203, an approximately 1.3 μm-thick non-doped i-type a-Si:H layer 204, and an approximately 0.1 μm-thick P (phosphorus)-doped n-type μc-Si:H layer 205 are layered in a vertical direction thereon.

A silicon oxide film 206, an ITO (indium tin oxide) film 207, and electrodes 208 and 209 comprising aluminum (Al) are further provided thereon.

Because the layers 203, 204, and 205 have approximately the same refractive index (3.4 to 3.6) as each other, and the refractive index is higher than the about 1.44 refractive index of the silicon thermal oxide film 202, silicon oxide film 206, and ITO film 207, the former layers act as an optical waveguide core and light waves propagate therein.

The optical waveguide has a rib-type structure with a width of about 3.0 μm, a height of about 1.5 μm, and a rib height of about 0.1 μm. The layers 203, 204, and 205 constitute a pin structure, and electrons or positive holes can be injected into the i-type a-Si:H layer 204.

Fabrication of the Electro-Optical Modulator According to the First Embodiment

The fabrication process of the electro-optical modulator according to the first embodiment shall now be described.

(1) A three-layer silicon film containing B (boron)-doped μc-Si:H (0.1 μm)/a-Si:H (1.3 μm)/P (phosphorus)-doped μc-Si:H (0.1 μm) is formed at 200° C. to 250° C. by plasma enhanced chemical vapor deposition (PECVD) on the 2 μm-thick silicon thermal oxide film grown on the silicon substrate.

(2) A rib waveguide having a width of 3.0 μm and a rib height of 0.1 μm is next formed using lithography and dry etching techniques.

(3) The same kind of process as in formation of the rib waveguide is next used, leaving the p-type μc-Si:H layer 203 positioned on the bottommost layer of the three-layer silicon film and forming a slab structure having a width of 10 μm.

(4) An about 0.5 μm thick silicon oxide film 206 is next deposited from a source gas of tetraethoxysilane (TEOS) at 350° C. by plasma CVD.

(5) A portion of the silicon oxide film 206 just above the optical waveguide and on the side of the slab structure is then removed by lithography and dry etching techniques to ensure electrical contact with either the p-type μc-Si:H layer or the n-type μc-Si:H layer.

(6) A 0.05 μm-thick ITO film 207 is deposited at room temperature by sputtering, and unwanted ITO film is removed by lithography and dry etching.

(7) Electrodes 208 and 209 comprising aluminum are finally formed by a lift off process, whereby the electro-optical modulator is completed. Aluminum is given as an example of an electrode material here, but a metal other than aluminum may be used.

The electro-optical modulator according to this first embodiment can be fabricated as above at a process temperature of 350° C. or lower.

Figure 2:
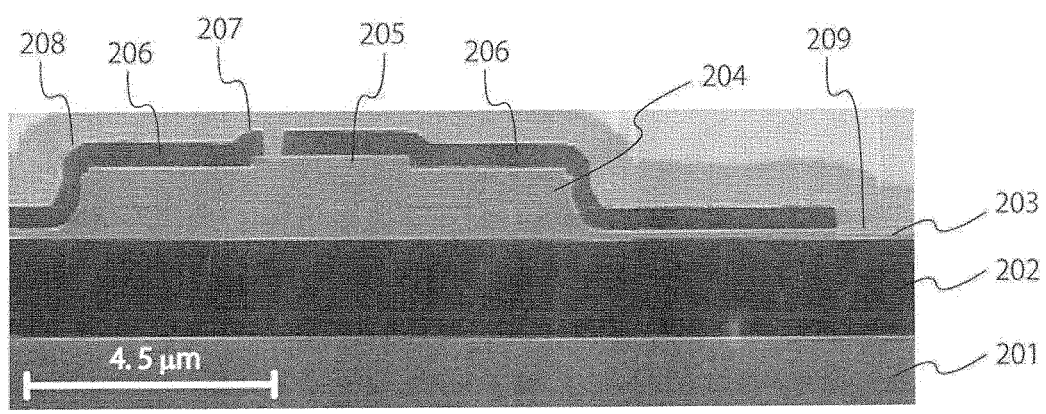
FIG. 2 is an SIM image of the electro-optical modulator according to the first embodiment.

FIG. 2 is a scanning ion microscope (SIM) image using a focused ion beam (FIB) on an electro-optical modulator actually fabricated as an embodiment.

In FIG. 2, 201 is the silicon substrate, 202 is the silicon thermal oxide film, 203 is the p-type μc-Si:H layer, 204 is the i-type a-Si:H layer, 205 is the n-type μc-Si:H layer, 206 is the silicon oxide film, 207 is the ITO film, and 208 and 209 are the aluminum electrodes.

(Operation of the Electro-Optical Modulator)

The operation of the abovementioned electro-optical modulator is described.

The electro-optical modulator is operated by applying voltage between the electrode 208 and the electrode 209 accompanied by the rib waveguide structure having the layers 203, 204, and 205 as the waveguide core.

When forward voltage is applied so that the potential on the p side becomes higher than on the n side, positive holes or electrons are injected into the i-type a-Si:H layer 204 from the p-type μc-Si:H layer 203 or the n-type μc-Si:H layer 205, respectively, and the carrier density increases mainly in the layer 204 as well as in the layers 203 and 205.

As a result, a change of refractive index expressed by a first approximation value is induced in accordance with a relational formula related to the Drude formula described below.

$$\Delta n = -\frac{e^2\lambda^2}{8\pi^2 c^2 \varepsilon_0 n}\left(\frac{\Delta N_e}{m_e} + \frac{\Delta N_h}{m_h}\right) \quad \{\text{Formula 1}\}$$

$$\Delta k = \frac{e^3\lambda^3}{16\pi^3 c^3 \varepsilon_0 n}\left(\frac{\Delta N_e}{m_e^2 \mu_e} + \frac{\Delta N_h}{m_h^2 \mu_h}\right)$$

In the above formula, $\Delta n$ and $\Delta k$ represent the change of the real part of the refractive index and the change of the imaginary part of the refractive index, respectively, e is the charge, $\lambda$ is the wavelength of the light wave, $\varepsilon_0$ is the free space permittivity, n is the refractive index of intrinsic silicon, m is the effective mass, $\mu$ is the free carrier mobility, and $\Delta N$ is the change of free carrier concentration. The subscripts e and h respectively represent physical quantities concerning electrons and holes, respectively.

An experimental evaluation of the electro-optical effect in amorphous silicon was carried out, and it turned out that the change of refractive index as a function of the concentration of free electrons and holes is well consistent with the Drude formula over the important wavelength regions (1330 nm and 1550 nm) where most optical communications is performed.

In light of the above, when positive holes or electrons are injected into the i-type a-Si:H layer 304 and the carrier density increases, the real part of the refractive index decreases and the imaginary part of the refractive index increases. Meanwhile, when the applied voltage is decreased, the carrier density of the i-type layer decreases, the real part of the refractive index increases, and the imaginary part of the refractive index decreases. That is, the phase or intensity of light waves propagating in the waveguide can be modulated by controlling the carrier density, in other words, the applied voltage.

Figure 3:
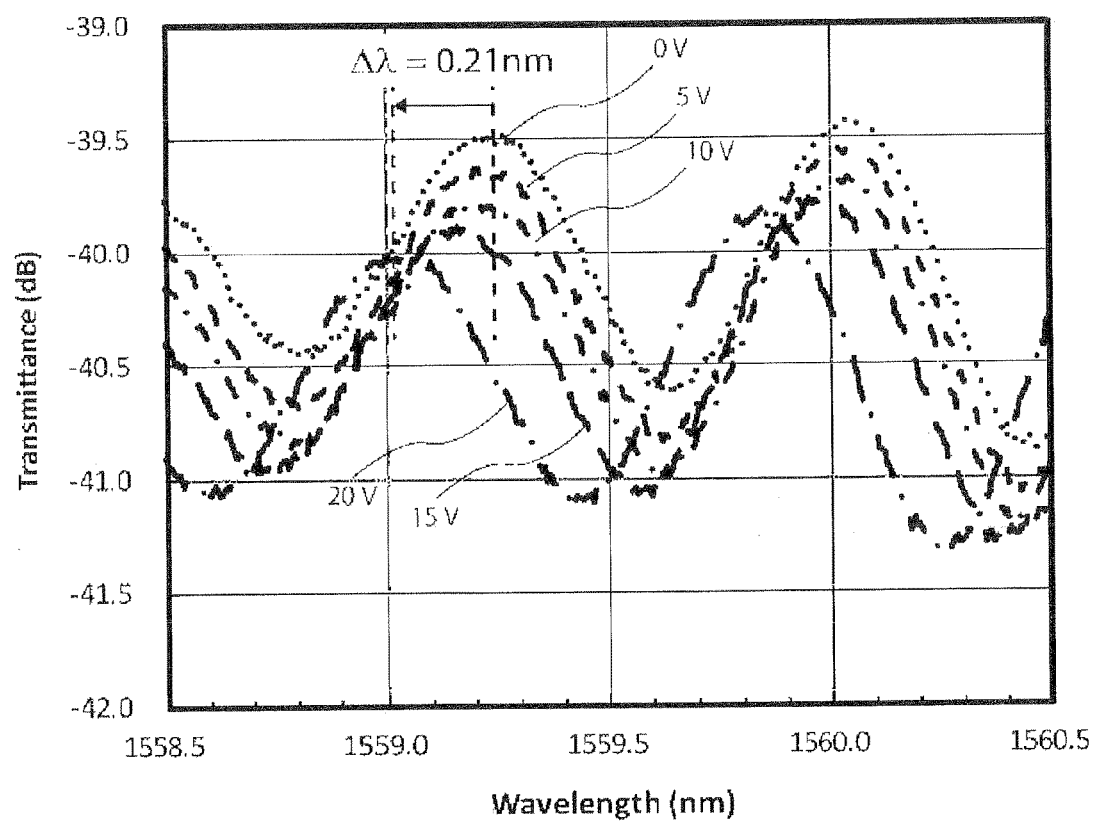
FIG. 3 is a graph of the modulation operation of the electro-optical modulator according to the first embodiment.

FIG. 3 expresses the transmission spectrum when the electro-optical modulator illustrated in FIG. 2 is configured inside a Fabry-Perot resonator. Two mirror surfaces that constitutes the Fabry-Perot resonator were fabricated by cleaving an optical waveguide having a pin structure at both ends. The cleaved surfaces act as mirror having a reflectance of about 30%.

While forward voltage was applied simultaneously, light waves were introduced from one end surface using an optical fiber, and light waves emitted from the other end surface were coupled again with the optical fiber. The transmitted light was then introduced to an optical spectral analyzer, and the spectrum was measured.

It is clear from the transmission spectrum illustrated in FIG. 3 that the resonance peak of the Fabry-Perot resonator shifts to the shorter wavelength as the applied voltage is increased. It is clear from this fact that the refractive index of the optical waveguide is reduced by injection of the carriers.

In the case of microcrystalline silicon, the mobility of holes is lower than that of electrons, and in the structure in FIG. 1, in which the carrier is injected from the side, the transport distance of the holes becomes longer, requiring higher applied voltage, but the applied voltage can be reduced by exchanging the p-type semiconductor layer 203 and the n-type semiconductor layer 205.

Although the refractive index of the optical waveguide was changed above by applying voltage between the semiconductor layers, in the electro-optical modulator according to the present invention, the refractive index of the optical waveguide can be changed also by flowing current between the semiconductor layers.

Modified Example of the First Embodiment

Figure 4:
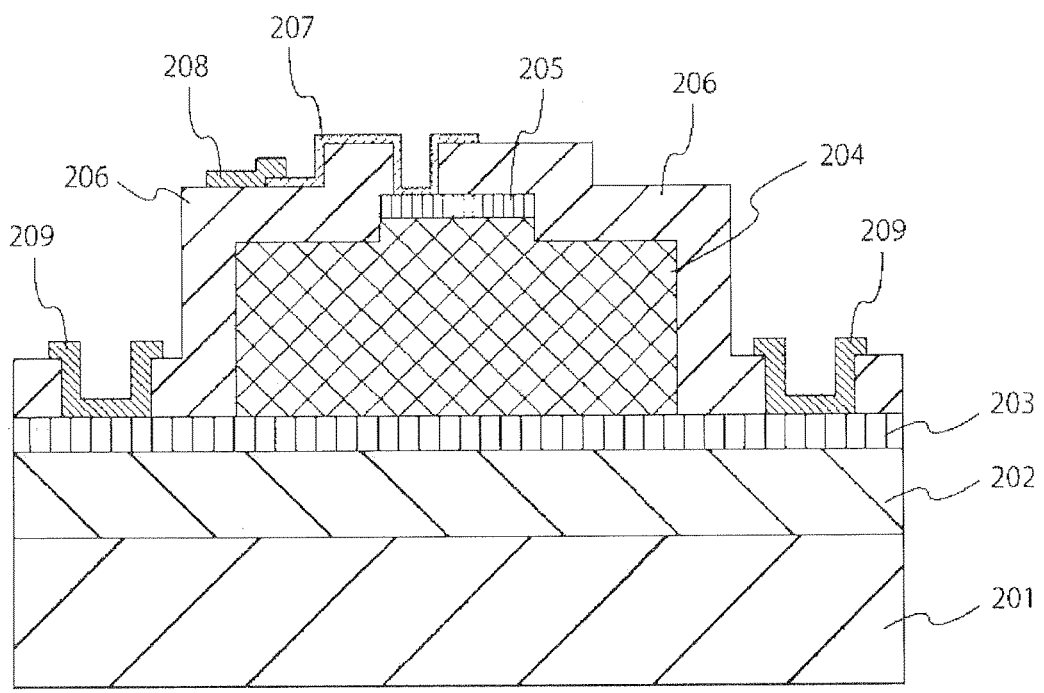
FIG. 4 is a cross-sectional schematic diagram of the electro-optical modulator according to a modified example of the first embodiment.

FIG. 4 illustrates a modified example of the first embodiment.

The basic structure of the electro-optical modulator illustrated as a modified example in FIG. 4 is approximately the same as in that in the first embodiment, but in this modified example, the p-type μc-Si:H layer 203 extends on the silicon thermal oxide film 202 past the end of the i-type a-Si:H layer. The structure is therefore such that lead-out of the electrode 209 is possible on both sides of the i-type a-Si:H layer 202, and the carrier can be injected more efficiently in the center of the waveguide where the light propagates.

Second Embodiment

Figure 5:
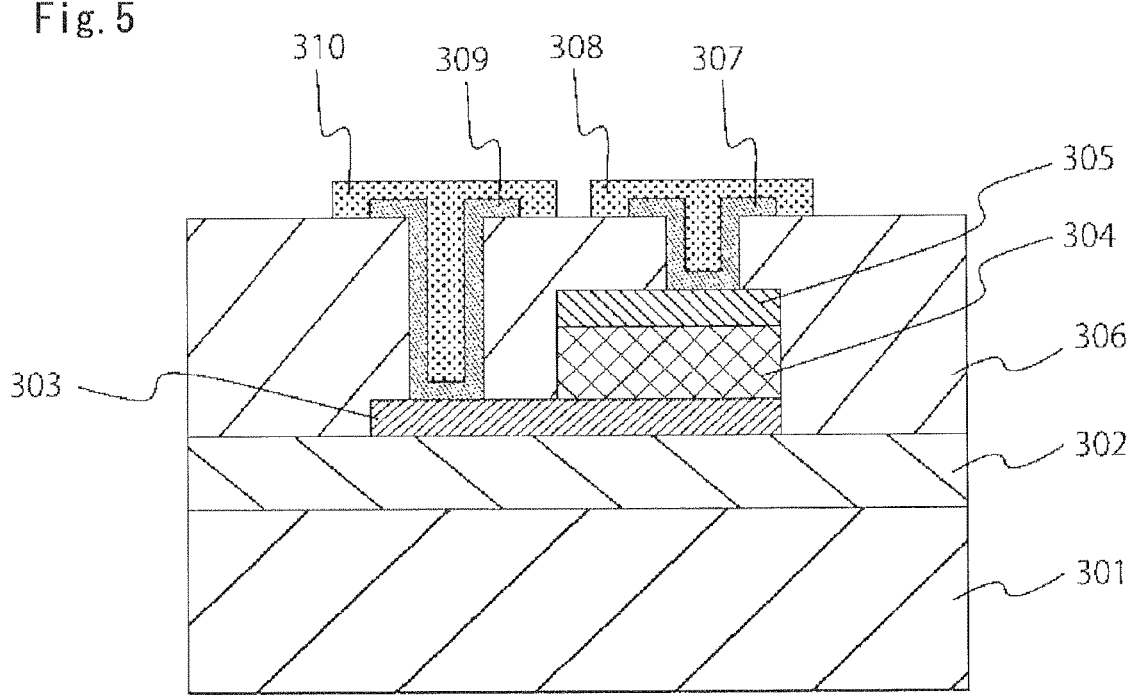
FIG. 5 is a cross-sectional schematic diagram of the electro-optical modulator according to a second embodiment.

FIG. 5 is a cross-sectional schematic diagram of a second embodiment of the present invention.

In the second embodiment, the p-type semiconductor layer and the n-type semiconductor layer are in a vertically stacked arrangement with the optical waveguide comprising an i-type amorphous semiconductor interposed therebetween, and electrode lead-out on the upper layer is made possible.

The electro-optical modulator illustrated in FIG. 5 is provided with a silicon thermal oxide film 302 obtained on a silicon substrate 301 by thermally oxidizing the silicon substrate, and a vertically stacking of a B (boron)-doped p-type μc-Si:H layer 303, a non-doped i-type a-Si:H layer 304, and a P (phosphorus)-doped n-type μc-Si:H layer 305 are provided thereon.

A silicon oxide film 306, an indium zinc oxide (IZO) film 307, and an electrode 308 are further provided thereon. An IZO film 309 and an electrode 310 are also provided as lead-out electrodes of the B (boron)-doped p-type μc-Si:H layer 303.

Because the layers 303, 304, and 305 have approximately the same refractive index (3.4 to 3.6) as each other, and the refractive indices of these layers are higher than those of the silicon thermal oxide film 302 with the approximately 1.44 refractive index, silicon oxide film 306, and IZO film 307, the former layers act as an optical waveguide core and light waves propagate therein.

The optical waveguide typically has a wire-type structure with a width of 0.5 μm and a height of about 0.2 μm.

The layers 303, 304, and 305 also constitute a pin structure, and electrons or positive holes can be injected into the i-type a-i:H layer 304.

(Fabrication of the Electro-Optical Modulator)

The processes for fabricating the electro-optical modulator illustrated in FIG. 5 are described.

(1) A silicon thermal oxide film 302 is formed on a silicon substrate 301. A high-temperature thermal oxidation process is required to form this silicon thermal oxide film. Therefore when it is favorable to use a low-temperature fabrication process, in addition to a silicon thermal oxide film, for example, a silicon oxide film from TEOS as a source gas, or a silicon suboxide film (SiOx), a silicon nitride film, or a silicon oxynitride film, or other material that can be deposited at 400° C. or lower by PECVD also are possible.

However, these materials must have a lower refractive index than that of the layers 303, 304, and 305 in order for the portion including the p-type μc-Si:H layer 303, the i-type a-Si:H layer 304, and the n-type μc-Si:H layer 305 to act as an optical waveguide core. It is also favorable that the materials have the smallest possible optical absorption in the operating wavelength in order to suppress optical loss as low as possible.

The surface of the silicon thermal oxide film 302 also is polished by chemical-mechanical polishing (CMP) as needed.

(2) A three-layer silicon film containing p-type μc-Si:H/i-type a-Si:H/n-type μc-Si:H is deposited on the silicon thermal oxide film 302 grown on the silicon substrate by PECVD.

(3) Utilizing lithography and etching, the layers 304 and 305 are then fabricated into an optical wire waveguide structure, leaving the p-type μc-Si:H layer 303.

(4) Subsequently a silicon oxide film from TEOS is next deposited to ensure optical and electrical insulation from the above optical waveguide core. In addition to a silicon oxide film, for example, a silicon suboxide film (SiOx), a silicon nitride film, a silicon oxynitride film, or other material also is possible, provided that the insulating material can be deposited at low temperature and has a lower refractive index than a-Si:H. The surface of the formed silicon oxide film 306 also is polished by chemical-mechanical polishing (CMP) as needed.

(5) A portion of the silicon oxide film 306 is removed as illustrated in FIG. 5 by lithography and etching.

(6) An IZO film 307 is deposited at room temperature by sputtering, and unwanted IZO is removed by lithography and dry etching.

(7) An electrode 308 is finally deposited.

In the electro-optical modulator illustrated in FIG. 5, the entire device can be made more compact by adopting a wire waveguide structure, compared with the structure of the electro-optical modulator illustrated in the first embodiment. That is, a higher modulation efficiency can be obtained because overlapping between the injected free carrier and light waves propagating in the waveguide increases and the electric field is concentrated.

Also in the case of the electro-optical modulator illustrated in FIG. 5, the thickness of the i-type a-Si:H layer 304 can be made thinner to about 0.2 μm. That is, higher speed operation can be obtained by reducing the transport distance of the injected carrier. Meanwhile, although the optical absorption of the IZO film 307 is lower compared with an ITO film, non-negligible optical loss occurs because the transparent conductive IZO film 307 is deposited directly on the waveguide. The following electro-optical modulator structures are given in order to solve this problem.

Modified Example 1 of the Second Embodiment

Figure 6:
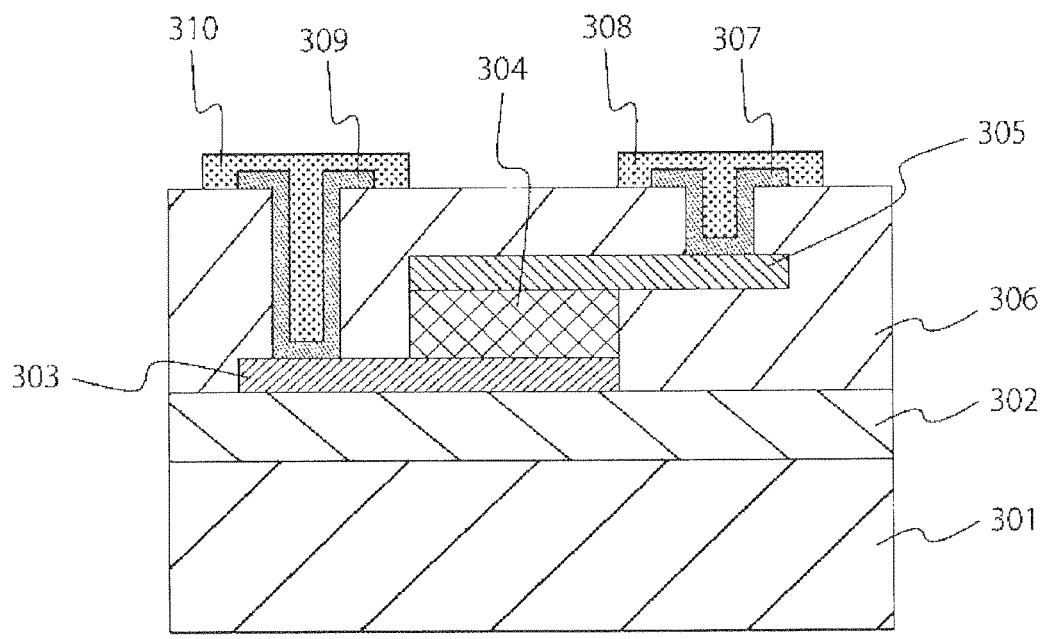
FIG. 6 is a cross-sectional schematic diagram of the electro-optical modulator according to modified example 1 of the second embodiment.

FIG. 6 illustrates a modified example 1 of the second embodiment.

The basic structure of the electro-optical modulator illustrated as modified example 1 in FIG. 6 is approximately the same as that of the second embodiment, but in this modified example 1, the shape of the n-type μs-Si:H layer 305 differs from that in the second embodiment.

In the structure in FIG. 6, the IZO film 307 having non-negligible optical absorption or the electrode 309 can be moved far from the optical waveguide, and the optical loss of the electro-optical modulator can be reduced.

Modified Example 2 of the Second Embodiment

Figure 7:
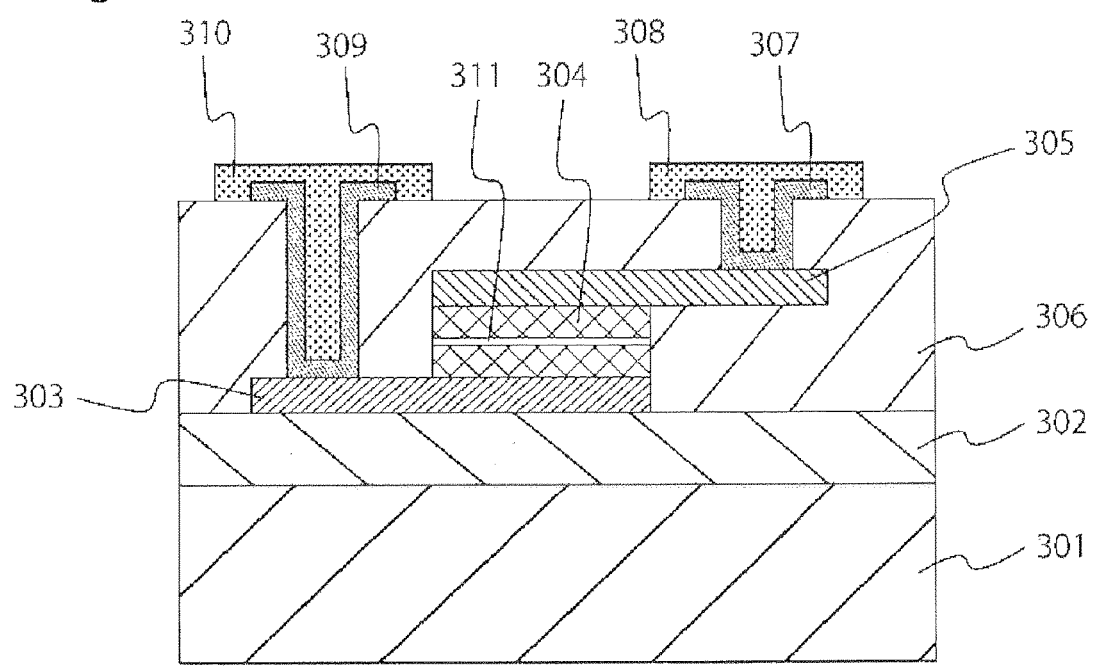
FIG. 7 is a cross-sectional schematic diagram of the electro-optical modulator according to modified example 2 of the second embodiment.

FIG. 7 illustrates a modified example 2 of the second embodiment.

The basic structure of the electro-optical modulator illustrated as modified example 2 in FIG. 7 is approximately the same as that of modified example 1 of the second embodiment, but this modified example 2 differs from modified example 1 in that an insulating film 311 is inserted inside the i-type a-Si:H layer 304.

In the structure in FIG. 7, the refractive index of the waveguide can be changed by allowing electrons and positive holes to accumulate at the interface between the insulating film 311 and the i-type a-Si:H layer 304. At this time, the power consumption can be reduced because substantially no current flows in the electro-optical modulator.

Third Embodiment

Figure 8:
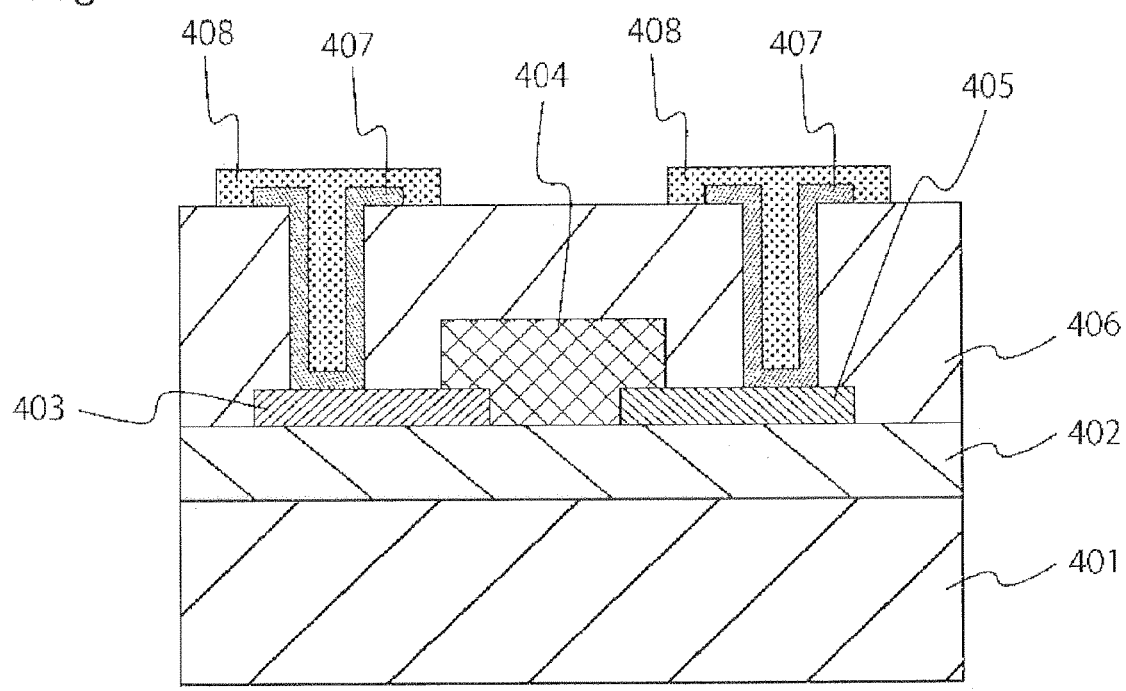
FIG. 8 is a cross-sectional schematic diagram of the electro-optical modulator according to a third embodiment.

FIG. 8 is a cross-sectional schematic diagram of a third embodiment of the present invention.

In the third embodiment, the p-type silicon-containing semiconductor layer and the n-type silicon-containing semiconductor layer are arranged adjacent to each other interposing the i-type amorphous semiconductor optical waveguide.

The electro-optical modulator illustrated in FIG. 8 is provided with a silicon thermal oxide film 402 obtained on a silicon substrate 401 by thermally oxidizing the silicon substrate, a B (boron)-doped p-type laser-crystallized silicon layer 403 and a P (phosphorus)-doped n-type laser-crystallized silicon layer 405 are provided on the identical plane thereon, a non-doped i-type a-Si:H layer 404 is provided thereon, and a silicon oxide film 406 is further provided thereon.

The p-type laser-crystallized silicon layer 403 and the n-type laser-crystallized silicon layer 405 extend on the silicon thermal oxide film 402 beyond the edge of the i-type a-Si:H layer. The structure is therefore such that lead-out from the electrode 408 is possible on both sides of the i-type a-Si:H layer 404.

A crystalline grain boundary is present in the laser-crystallized silicon that is used in the p-type laser-crystallized silicon layer 403 and the n-type laser crystallized silicon layer 405 in FIG. 8, and because optical scattering occurs at that grain boundary, there is the greater optical loss than in the a-Si:H where there is no grain boundary. In addition, the p-type laser-crystallized silicon layer 403 and the n-type laser-crystallized silicon layer 405 have absorption loss originating from the carrier due to impurity doping.

In light of the above, the layers 403 and 405 have greater optical loss than the i-type a-Si:H layer 404. In the structure in FIG. 8, optical loss can be reduced by reducing the overlap of the p-type layer or the n-type layer with the i-type layer.

In the electro-optical modulator illustrated in FIG. 8, the entire, device can be made more compact by adopting a wire waveguide structure, compared with the structure of the electro-optical modulator illustrated in the first embodiment. That is, a higher modulation efficiency can be obtained because overlapping between the injected free carrier and light waves propagating in the waveguide increases and the electric field is concentrated due to its miniaturization.

Also in the case of the electro-optical modulator illustrated in FIG. 8, the transport distance between the p-type laser-crystallized silicon layer 403 and the n-type laser-crystallized silicon layer 405 can be made smaller than 0.5 μm, being the width of the wire waveguide, compared with the modulator structure of the first embodiment illustrated in FIG. 1. That is, higher speed operation can be obtained by reducing the transport distance of the injected carrier.

Modified Example of the Third Embodiment

Figure 9:
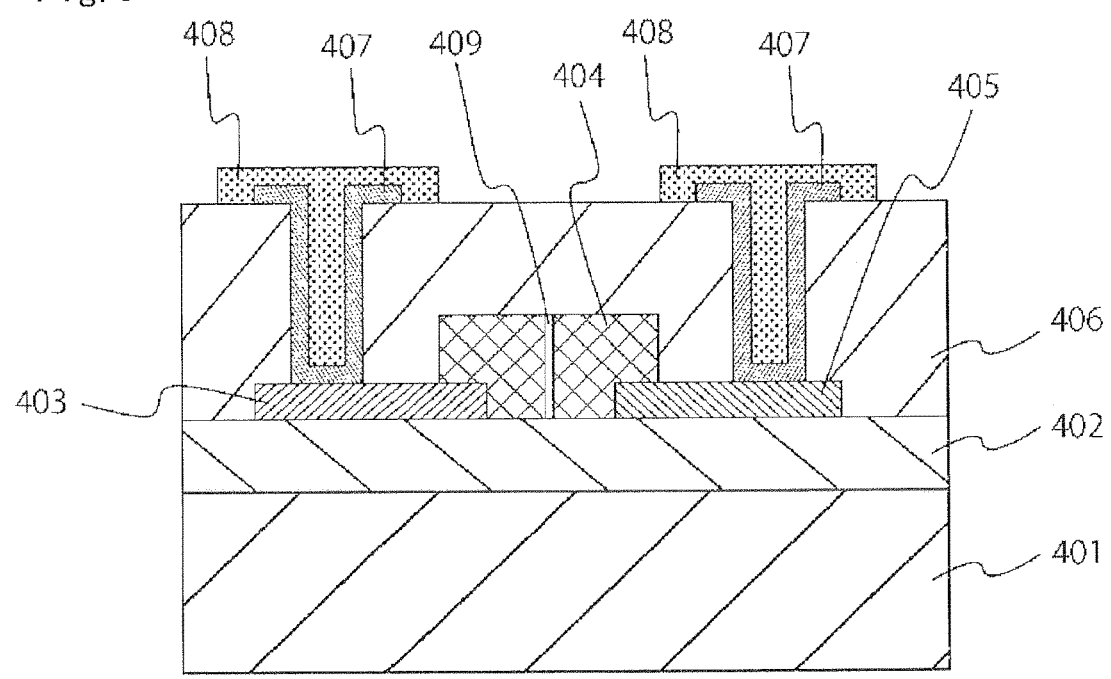
FIG. 9 is a cross-sectional schematic diagram of the electro-optical modulator according to a modified example of the third embodiment.

FIG. 9 illustrates a modified example of the third embodiment.

The basic structure of the electro-optical modulator illustrated as a modified example in FIG. 9 is approximately the same as that of the third embodiment, but this modified example differs from the third embodiment in that an insulating film 409 is inserted inside the i-type a-Si:H layer 404.

In the structure in FIG. 9, the refractive index of the waveguide can be changed by allowing electrons and positive holes to accumulate at the interface between the insulating film 409 and the i-type a-Si:H layer 404. At this time, the power consumption can be reduced because substantially no current flows in the electro-optical modulator.

Fourth Embodiment

Figure 10:
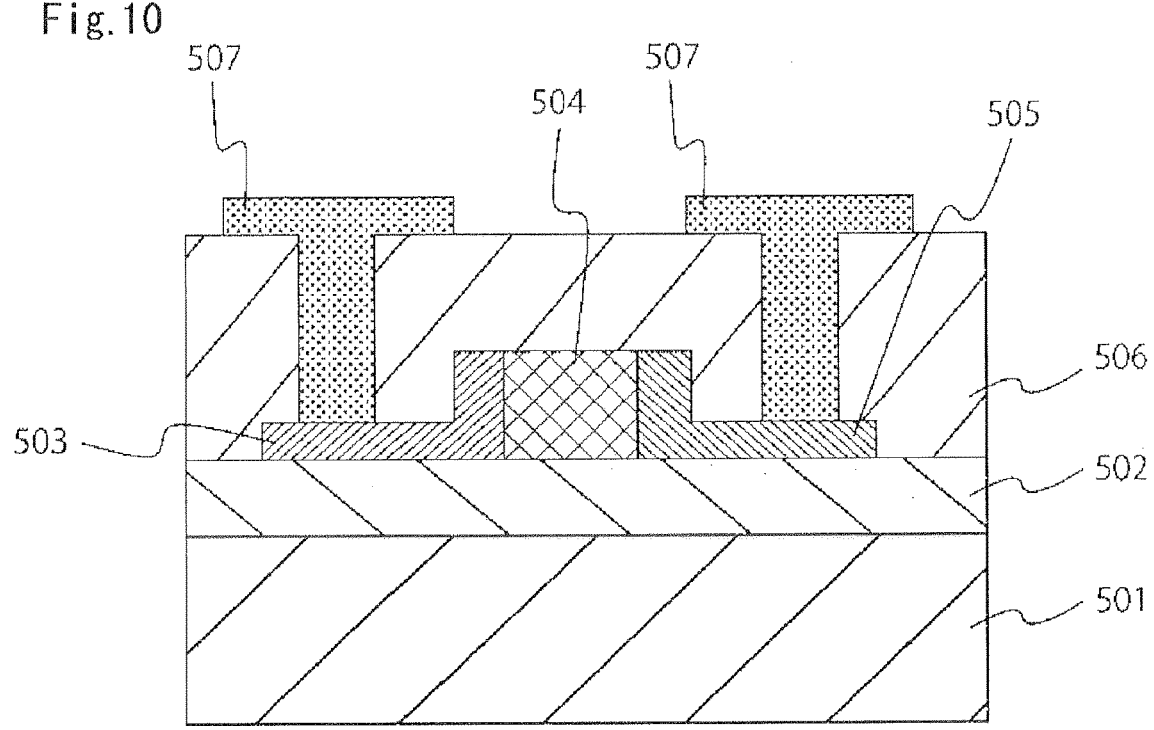
FIG. 10 is a cross-sectional schematic diagram of the electro-optical modulator according to a fourth embodiment.
Figure 11:
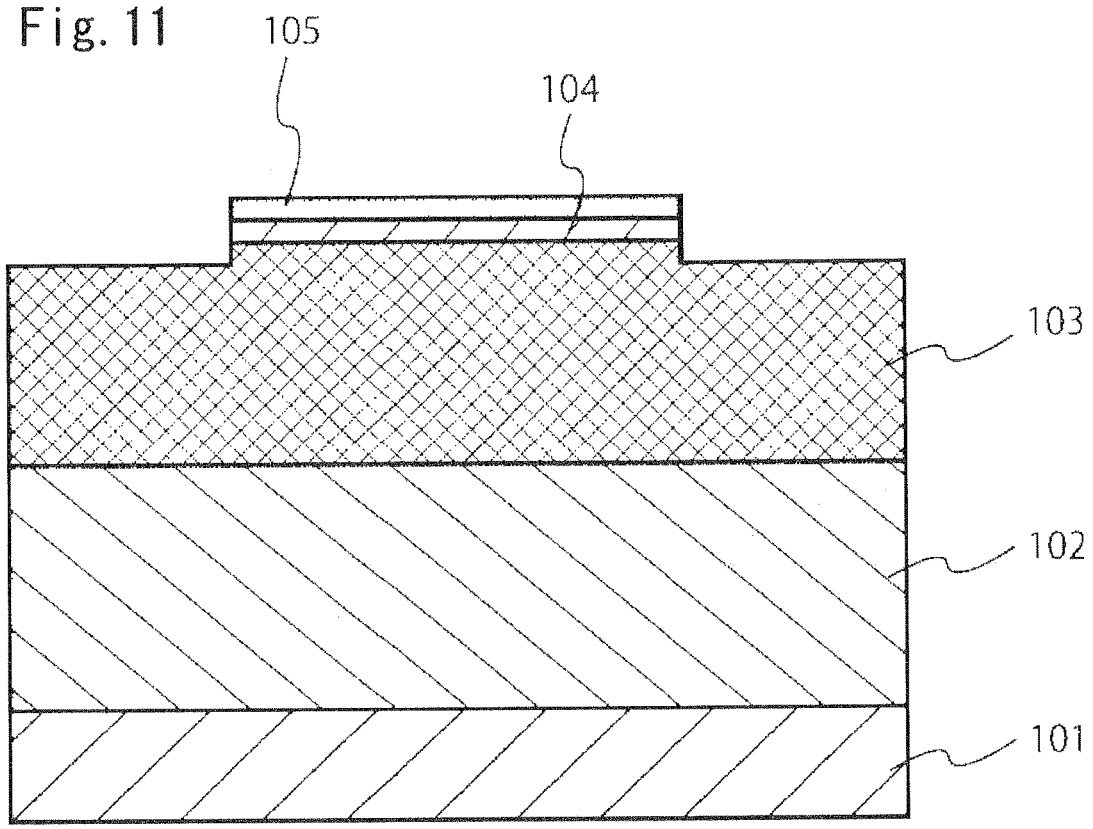
FIG. 11 is a cross-sectional schematic diagram of a conventional electro-optical modulator.

FIG. 10 is a cross-sectional schematic diagram of a fourth embodiment of the present invention.

The structure of the fourth embodiment is similar to that of the third embodiment, but differs from the third embodiment in that the structure is such that a p-type c-Si layer 503 and an n-type c-Si layer 505 cover the entire side walls of an i-type a-Si:H layer 504.

In the electro-optical modulator illustrated in FIG. 10, the carrier can be injected uniformly into the i-type amorphous semiconductor optical waveguide from the p-type c-Si layer 503 and the n-type c-Si layer 505, circumventing the situation that the carriers is concentrated at the lower part of the waveguide as in the third embodiment. As a result, overlapping between the propagating light waves and the carrier increases, and the modulation efficiency is increased.

Modifications of the constituent elements of the electro-optical modulator according to the present invention are illustrated below.

(Substrate)

In the embodiments, silicon substrates were given as examples as substrates 201, 301, 401, and 501, but the present invention is not limited to this; SOI substrates, optical integrated circuit boards also are possible.

(Silicon Thermal Oxide Film)

In the embodiments, silicon thermal oxide films 202, 302, 402, and 502 were given as examples, but the present invention is not limited to this; for example, silicon oxide films, silicon suboxide films (SiOx), silicon nitride films, silicon oxynitride films, and other materials deposited by plasma CVD process also are possible, provided that the insulating material has a lower refractive index than a-Si:H.

(i-Type Amorphous Semiconductor Optical Waveguide)

In the embodiments, amorphous silicon was given as an example as silicon-containing i-type amorphous semiconductors 204, 304, 404, and 504, but the present invention is not limited to this; silicon-containing Si—Ge, and the like, are also possible. Amorphous Si—Ge has a higher refractive index than amorphous silicon or crystalline silicon, and optical loss can be reduced because light can be confined efficiently in the i-type amorphous semiconductor 204, 304, 404, or 504. The silicon-containing i-type amorphous semiconductor not only may be deposited using $SiH_4$ or other hydrogenated substances as a source gas, but may also be films containing a halogen produced using $SiF_4$ or $SiH_2Cl_2$, or the like, as a source gas.

(Silicon-Containing p-Type Semiconductor Layer and Silicon-Containing n-Type Semiconductor Layer)

In the embodiments, hydrogenated microcrystalline silicon (μc-Si:H) layers, laser-crystallized silicon layers, metal induced solid phase crystallized silicon, and single crystalline silicon were given as examples for the silicon-containing p-type semiconductor layers 203, 303, 403, and 503, and the silicon-containing n-type semiconductor layers 205, 305, 405, and 505, but microcrystalline SiO and microcrystalline SiO also are possible. Microcrystalline SiC and microcrystalline SiO have a lower refractive index than amorphous silicon or crystalline silicon, and optical loss can be reduced because light can be confined efficiently in the i-type amorphous semiconductor 204, 304, 404, or 504.

With regard to laser crystallization, scanning the laser at the optimum speed in the waveguide direction induces lateral crystalline growth and thus make a fewer grain boundaries of a semiconductor layer in the waveguide direction, which is effective from the viewpoint of reducing scattering.

It might be effective that only one of the silicon-containing p-type and n-type semiconductor layers may be a crystalline semiconductor layer.

Furthermore, the silicon-containing p-type and n-type semiconductor layers in the embodiments can be mutually interchanged.

(Silicon Oxide Film Constituting Upper Cladding)

In the embodiments, the upper cladding was made with a silicon oxide film 206, 306, or 406, but in addition to a silicon oxide film, the upper cladding may be, for example, a silicon suboxide film (SiOx), a silicon nitride film, a silicon oxynitride film, or the like, provided that the insulating material can be deposited at low temperature and has a lower refractive index than a-Si:H.

(Indium Tin Oxide (ITO) Film, or the Like)

In the embodiments, an ITO film 207 and IZO films 307, 309, and 407 were given as examples, but, for example, zinc oxide is also possible provided that the material has lower optical absorption than the electrode 208, 308, 310, or 408 and has higher conductivity than the p-type layer 203, 303, or 403 or the n-type layer 205, 305, or 405.

It should be noted that an ITO film, or the like may be unnecessary if the conductivity of the p-type semiconductor layer or the n-type semiconductor layer is sufficiently high.

REFERENCE SIGNS LIST

101 Silicon substrate
102 p-type a-SiC:H layer
103 i-type a-Si:H layer
104 n-type a-SiC:H layer
105 Zinc oxide/aluminum electrode
201 Silicon substrate
202 Silicon thermal oxide film
203 p-type μc-Si:H layer
204 i-type a-Si:H layer
205 n-type μc-Si:H layer
206 Silicon oxide film
207 ITO film
208 Electrode
209 Electrode
301 Silicon substrate 302 Silicon thermal oxide film
303 p-type μc-Si:H layer
304 i-type a-Si:H layer
305 n-type μc-Si:H layer
306 Silicon oxide film
307 IZO film
308 Electrode
309 IZO film
310 Electrode
311 Insulating film
401 Silicon substrate
402 Silicon thermal oxide film
403 p-type laser-crystallized silicon layer
404 i-type a-Si:H layer
405 n-type laser-crystallized silicon layer
406 Silicon oxide film
407 IZO film
408 Electrode
409 Insulating film
501 Silicon substrate
502 Silicon thermal oxide film
503 p-type c-Si layer
504 i-type a-Si:H layer
505 n-type c-Si layer
506 Silicon oxide film
507 Electrode

The invention claimed is:

1. An electro-optical modulator, comprising: an optical waveguide comprising a silicon-containing i-type amorphous semiconductor; and a silicon-containing p-type semiconductor layer and a silicon-containing n-type semiconductor layer arranged apart from each other with said optical waveguide comprising an i-type amorphous semiconductor interposed therebetween and constituting optical waveguides together with said optical waveguide comprising an i-type amorphous semiconductor; wherein said p-type semiconductor layer and/or said n-type semiconductor layer are crystalline semiconductor layer.

2. An electro-optical modulator, comprising: a substrate; an optical waveguide comprising a silicon-containing i-type amorphous semiconductor formed on the substrate; and a silicon-containing p-type semiconductor layer and a silicon-containing n-type semiconductor layer arranged apart from each other with said optical waveguide comprising an i-type amorphous semiconductor interposed therebetween and constituting optical waveguides together with said optical waveguide comprising an i-type amorphous semiconductor; wherein said p-type semiconductor layer and/or said n-type semiconductor layer are a crystalline semiconductor layer.

3. The electro-optical modulator according to claim 1, wherein said silicon-containing i-type amorphous semiconductor is hydrogenated amorphous silicon.

4. The electro-optical modulator according to claim 1, wherein said silicon-containing i-type amorphous semiconductor is hydrogenated amorphous Si—Ge.

5. The electro-optical modulator according to claim 1, wherein said crystalline semiconductor layer comprises hydrogenated microcrystalline silicon.

6. The electro-optical modulator according to claim 1, wherein said crystalline semiconductor layer is a semiconductor layer comprising laser-crystallized silicon.

7. The electro-optical modulator according to claim 1, wherein said crystalline semiconductor layer comprises metal induced solid phase crystallized silicon.

8. The electro-optical modulator according to claim 1, wherein said crystalline semiconductor layer comprises single crystalline silicon.

9. The electro-optical modulator according to claim 1, wherein said crystalline semiconductor layer is microcrystalline SiC.

10. The electro-optical modulator according to claim 1, wherein said crystalline semiconductor layer is microcrystalline SiO.

11. The electro-optical modulator according to claim 1, wherein said p-type semiconductor layer and said n-type semiconductor layer are in a vertically stacked arrangement with said optical waveguide comprising an i-type amorphous semiconductor interposed therebetween.

12. The electro-optical modulator according to claim 1, wherein said p-type semiconductor layer and said n-type semiconductor layer are in a laterally adjacent arrangement with said optical waveguide comprising an i-type amorphous semiconductor interposed therebetween.

13. The electro-optical modulator according to claim 1, wherein said p-type semiconductor layer and said n-type semiconductor layer are in a laterally opposing arrangement with said optical waveguide comprising an i-type amorphous semiconductor interposed therebetween.

14. The electro-optical modulator according to claim 1, wherein the refractive index of said optical waveguide comprises an i-type amorphous semiconductor being made variable by applying voltage or flow current between said p-type semiconductor layer and said n-type semiconductor layer.

15. The electro-optical modulator according to claim 1, wherein said substrate is an SOT substrate.

16. The electro-optical modulator according to claim 1, wherein said substrate is an optical integrated circuit substrate.

17. The electro-optical modulator according to claim 2, wherein said silicon-containing i-type amorphous semiconductor is hydrogenated amorphous silicon.

18. The electro-optical modulator according to claim 2, wherein said silicon-containing i-type amorphous semiconductor is hydrogenated amorphous Si—Ge.

19. The electro-optical modulator according to claim 2, wherein said crystalline semiconductor layer comprises hydrogenated microcrystalline silicon.

20. The electro-optical modulator according to claim 2, wherein said crystalline semiconductor layer is a semiconductor layer comprising laser-crystallized silicon.

21. The electro-optical modulator according to claim 2, wherein said crystalline semiconductor layer comprises metal induced solid phase crystallized silicon.

22. The electro-optical modulator according to claim 2, wherein said crystalline semiconductor layer comprises single crystalline silicon.

23. The electro-optical modulator according to claim 2, wherein said crystalline semiconductor layer is microcrystalline SiC.

24. The electro-optical modulator according to claim 2, wherein said crystalline semiconductor layer is microcrystalline SiO.

25. The electro-optical modulator according to claim 2, wherein said p-type semiconductor layer and said n-type semiconductor layer are in a vertically stacked arrangement with said optical waveguide comprising an i-type amorphous semiconductor interposed therebetween.

26. The electro-optical modulator according to claim 2, wherein said p-type semiconductor layer and said n-type semiconductor layer are in a laterally adjacent arrangement with said optical waveguide comprising an i-type amorphous semiconductor interposed therebetween.

27. The electro-optical modulator according to claim 2, wherein said p-type semiconductor layer and said n-type semiconductor layer are in a laterally opposing arrangement with said optical waveguide comprising an i-type amorphous semiconductor interposed therebetween.

28. The electro-optical modulator according to claim 2, wherein the refractive index of said optical waveguide comprises an i-type amorphous semiconductor being made variable by applying voltage or flow current between said p-type semiconductor layer and said n-type semiconductor layer.

29. The electro-optical modulator according to claim 2, wherein said substrate is an SOI substrate.

30. The electro-optical modulator according to claim 2, wherein said substrate is an optical integrated circuit substrate.

* * * * *